United States Patent
Hashimoto et al.

(10) Patent No.: US 12,304,150 B2
(45) Date of Patent: May 20, 2025

(54) THREE-DIMENSIONAL MOLDING DEVICE

(71) Applicant: SEIKO EPSON CORPORATION, Tokyo (JP)

(72) Inventors: Taki Hashimoto, Nagano (JP); Masayuki Gozu, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/156,433

(22) Filed: Jan. 19, 2023

(65) Prior Publication Data
US 2023/0234299 A1 Jul. 27, 2023

(30) Foreign Application Priority Data
Jan. 21, 2022 (JP) ................................. 2022-007690

(51) Int. Cl.
*B29C 64/393* (2017.01)
*B29C 64/209* (2017.01)
(Continued)

(52) U.S. Cl.
CPC .......... *B29C 64/393* (2017.08); *B29C 64/209* (2017.08); *B33Y 30/00* (2014.12); *B33Y 50/02* (2014.12)

(58) Field of Classification Search
None
See application file for complete search history.

(56) References Cited

U.S. PATENT DOCUMENTS

2016/0039148 A1*  2/2016  Marino ................. B29C 64/393
                                                         425/150
2016/0068793 A1*  3/2016  Maggiore ............. B29C 64/188
                                                          901/22
(Continued)

FOREIGN PATENT DOCUMENTS

JP          2017-217792 A      12/2017

OTHER PUBLICATIONS

CN-104148629-A (Year: 2014).*
(Continued)

*Primary Examiner* — Xiao S Zhao
*Assistant Examiner* — Guy F Mongelli
(74) *Attorney, Agent, or Firm* — Global IP Counselors, LLP

(57) ABSTRACT

A three-dimensional molding device includes: a molding unit including a nozzle configured to eject a molding material from a nozzle opening formed in a distal end portion; a stage having a deposition surface on which the molding material is deposited; a movement mechanism configured to change relative positions of the nozzle and the stage; a measurement unit configured to measure a distance between the deposition surface and the distal end portion; and a control unit configured to control the movement mechanism. The measurement unit includes a contact-type first detection unit configured to move in conjunction with the nozzle, and a contact-type second detection unit configured to move in conjunction with the stage. The first detection unit and the second detection unit are configured such that, when the first detection unit and the second detection unit come into contact with each other, one of the first detection unit and the second detection unit detects the contact.

13 Claims, 7 Drawing Sheets

(51) Int. Cl.
    *B33Y 30/00*    (2015.01)
    *B33Y 50/02*    (2015.01)

(56) References Cited

U.S. PATENT DOCUMENTS

| | | | |
|---|---|---|---|
| 2016/0257068 A1* | 9/2016 | Albert | B29C 64/232 |
| 2016/0297149 A1* | 10/2016 | Albert | B33Y 50/02 |
| 2018/0186094 A1* | 7/2018 | Yang | B33Y 99/00 |
| 2022/0197306 A1* | 6/2022 | Cella | G05D 1/0221 |
| 2023/0118219 A1* | 4/2023 | Lothschutz | B23K 26/1224 |
| | | | 269/21 |

OTHER PUBLICATIONS

CN-109591290-A (Year: 2019).*
WO-2020201634-A1 (Year: 2020).*
CN-112549536-A (Year: 2021).*
CN-112644022-A (Year: 2021).*
CN-113650294-A (Year: 2021).*
WO 2021/209787 (Year: 2021).*

* cited by examiner

THREE-DIMENSIONAL MOLDING DEVICE

The present application is based on, and claims priority from JP Application Serial Number 2022-007690, filed on Jan. 21, 2022, the disclosure of which is hereby incorporated by reference herein in its entirety.

BACKGROUND

1. Technical Field

The present disclosure relates to a three-dimensional molding device.

2. Related Art

There is known a three-dimensional molding device that molds a three-dimensional molded object by ejecting and laminating a plasticized material and curing the material.

For example, JP-A-2017-217792 discloses a molding device including a reference portion distance detection unit that is integrally supported with a placement table and detects a distance L3 to a molding reference portion on a molding unit, and a placement surface distance acquisition unit that acquires a distance L5 between the reference portion distance detection unit and a placement surface, and the molding device detects a molding use distance L between the placement surface and the molding reference portion on the molding unit based on a distance (L3-L5). JP-A-2017-217792 discloses that it is preferable to use a non-contact-type distance detection unit as the reference portion distance detection unit and the placement surface distance acquisition unit.

The inventors considered that it is preferable to use a contact-type distance detection unit rather than the non-contact-type distance detection unit in order to perform measurement at low cost with higher accuracy, but found that, in a case where the molding use distance L is detected using a plurality of distance detection units, inconvenience occurs when the distance detection units come into contact with each other.

SUMMARY

According to an aspect of the present disclosure, there is provided a three-dimensional molding device including: a molding unit including a nozzle configured to eject a molding material from a nozzle opening formed in a distal end portion; a stage having a deposition surface on which the molding material is deposited; a movement mechanism configured to change relative positions of the nozzle and the stage; a measurement unit configured to measure a distance between the deposition surface and the distal end portion; and a control unit configured to control the movement mechanism. The measurement unit includes a contact-type first detection unit configured to move in conjunction with the nozzle, and a contact-type second detection unit configured to move in conjunction with the stage. The first detection unit and the second detection unit are configured such that, when the first detection unit and the second detection unit come into contact with each other, one of the first detection unit and the second detection unit detects the contact.

DESCRIPTION OF EXEMPLARY EMBODIMENTS

Hereinafter, a preferred embodiment of the present disclosure will be described in detail with reference to the drawings. The embodiment to be described below does not unduly limit the scope of the present disclosure described in the claims. In addition, not all configurations to be described below are necessarily essential components of the present disclosure.

1. Three-dimensional Molding Device

1.1. Overall Configuration

Figure 1:
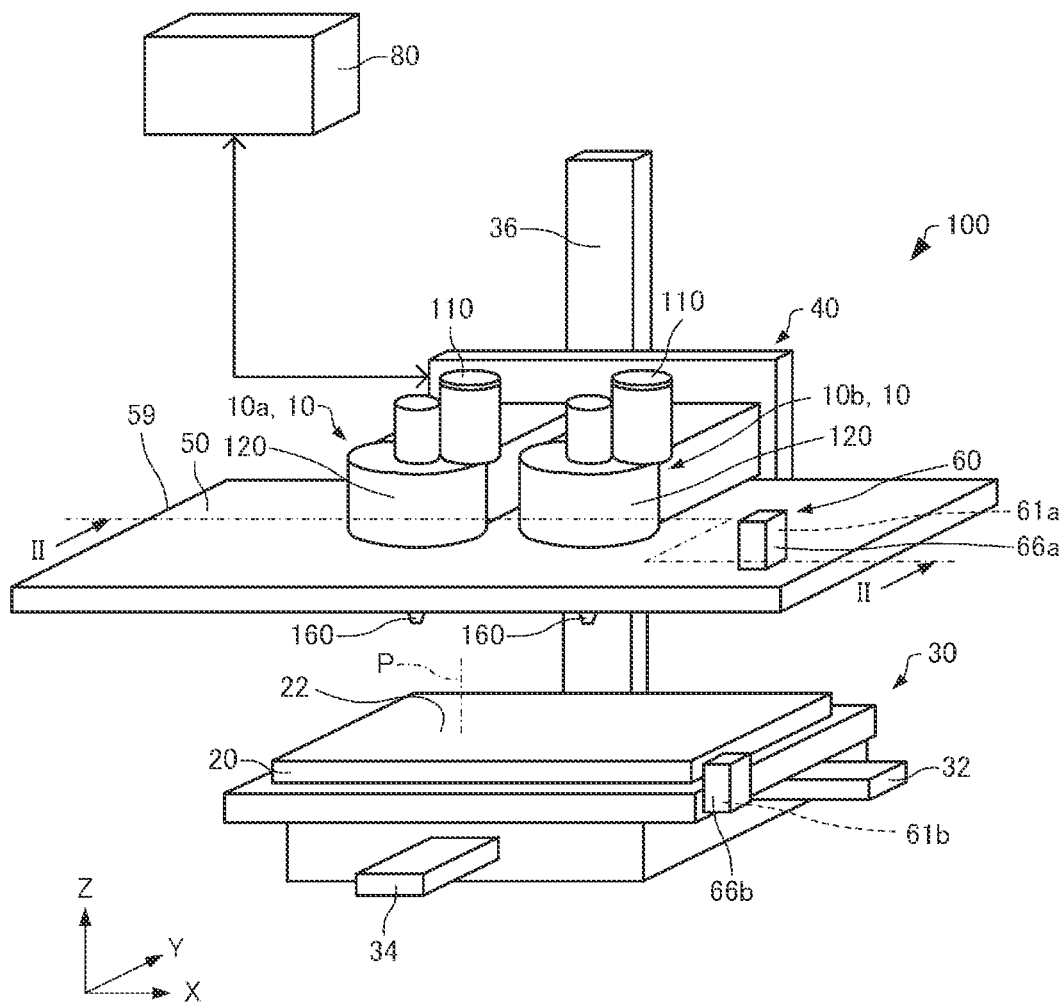
FIG. 1 is a perspective view schematically showing a three-dimensional molding device according to an embodiment.
Figure 2:
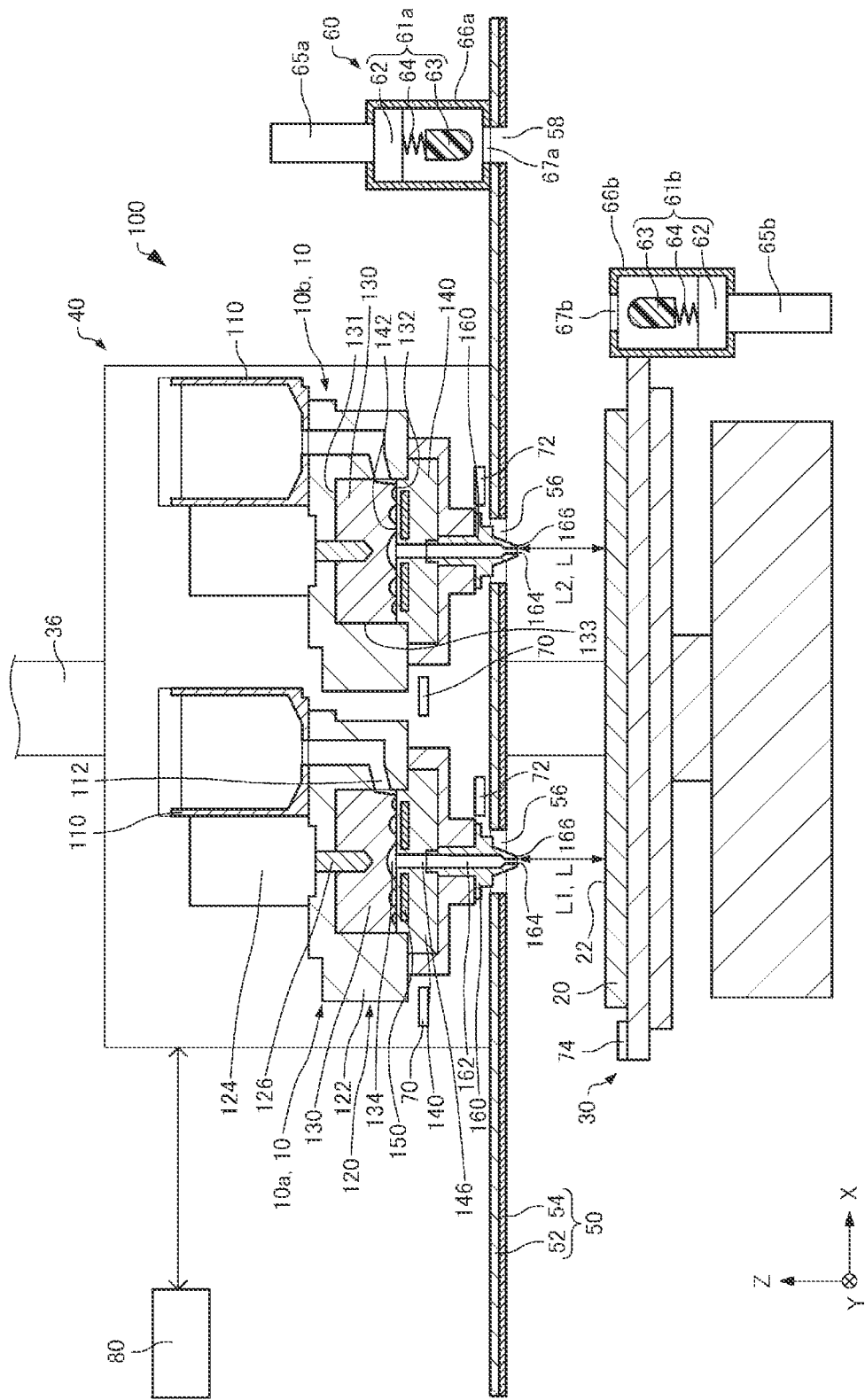
FIG. 2 is a cross-sectional view schematically showing the three-dimensional molding device according to the present embodiment.

First, a three-dimensional molding device according to the present embodiment will be described with reference to the drawings. FIG. 1 is a perspective view schematically showing a three-dimensional molding device 100 according to the present embodiment. FIG. 2 is a cross-sectional view taken along a line II-II in FIG. 1 schematically showing the three-dimensional molding device 100 according to the present embodiment. FIGS. 1 and 2 show an X axis, a Y axis, and a Z axis as three axes orthogonal to each other. An X-axis direction and a Y-axis direction are, for example, horizontal directions. A Z-axis direction is, for example, a vertical direction.

As shown in FIGS. 1 and 2, the three-dimensional molding device 100 includes, for example, a molding unit 10, a stage 20, a movement mechanism 30, a support member 40, an upper heater 50, a measurement unit 60, first replacement detection units 70, second replacement detection units 72, a third replacement detection unit 74, and a control unit 80. For convenience, the replacement detection units 70, 72, 74 are not shown in FIG. 1.

The three-dimensional molding device 100 drives the movement mechanism 30 to change relative positions of the molding unit 10 and the stage 20 while ejecting a plasticized molding material from the molding unit 10 toward the stage 20. Accordingly, the three-dimensional molding device 100 molds a three-dimensional molded object having a desired shape on the stage 20.

The three-dimensional molding device 100 includes a first molding unit 10a and a second molding unit 10b as the molding unit 10. In the shown example, the first molding unit 10a and the second molding unit 10b are arranged in the X-axis direction. The first molding unit 10a and the second molding unit 10b have the same configuration, for example. Both the first molding unit 10a and the second molding unit 10b may eject the molding material for forming the three-dimensional molded object, or one may eject the molding material and the other may eject a support material that supports the three-dimensional molded object. Although not shown, one of the first molding unit 10*a* and the second molding unit 10*b* may not be provided.

The molding unit 10 includes, for example, a material supply unit 110, a plasticization unit 120, and a nozzle 160.

A pellet-shaped material or a powdery material is put into the material supply unit 110. The material supply unit 110 supplies the material serving as a raw material to the plasticization unit 120. The material supply unit 110 is implemented by, for example, a hopper. The material supplied by the material supply unit 110 is, for example, an acrylonitrile-butadiene-styrene (ABS) resin.

As shown in FIG. 2, the material supply unit 110 and the plasticization unit 120 are coupled by a supply path 112 provided below the material supply unit 110. The material put into the material supply unit 110 is supplied to the plasticization unit 120 via the supply path 112.

The plasticization unit 120 includes, for example, a screw case 122, a drive motor 124, a flat screw 130, a barrel 140, and a barrel heater 150. The plasticization unit 120 plasticizes the material in a solid state supplied from the material supply unit 110, generates a paste-shaped molding material having fluidity, and supplies the molding material to the nozzle 160.

"Plasticization" is a concept including melting, and means changing from a solid state to a flowable state. Specifically, for a material in which glass transition occurs, plasticization is to set a temperature of the material to be equal to or higher than a glass transition point. For a material in which glass transition does not occur, plasticization is to set a temperature of the material to be equal to or higher than a melting point.

The screw case 122 is a housing that accommodates the flat screw 130. The barrel 140 is provided on a lower surface of the screw case 122. The flat screw 130 is accommodated in a space surrounded by the screw case 122 and the barrel 140.

The drive motor 124 is provided on an upper surface of the screw case 122. The drive motor 124 is, for example, a servomotor. A shaft 126 of the drive motor 124 is coupled to an upper surface 131 of the flat screw 130. The drive motor 124 is controlled by the control unit 80. Although not shown, the shaft 126 of the drive motor 124 and the upper surface 131 of the flat screw 130 may be coupled to each other via a speed reducer.

The flat screw 130 has a substantially cylindrical shape in which a size in a direction of a rotation axis R is smaller than a size in a direction orthogonal to the direction of the rotation axis R. In the shown example, the rotation axis R is parallel to the Z axis. The flat screw 130 is rotated about the rotation axis R by a torque generated by the drive motor 124.

Figure 3:
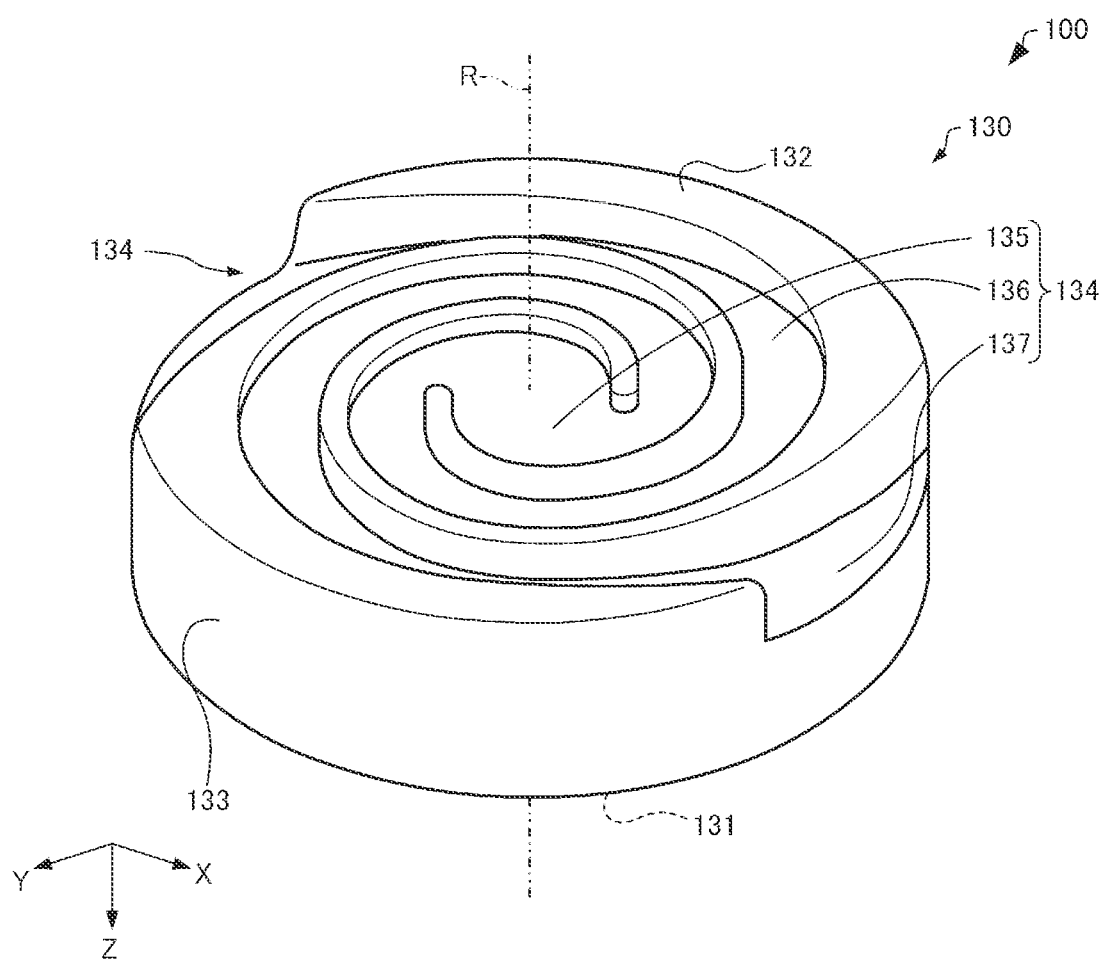
FIG. 3 is a perspective view schematically showing a flat screw of the three-dimensional molding device according to the present embodiment.

The flat screw 130 has the upper surface 131, a groove forming surface 132 opposite to the upper surface 131, and a side surface 133 coupling the upper surface 131 and the groove forming surface 132. First grooves 134 are formed in the groove forming surface 132. The side surface 133 is, for example, perpendicular to the groove forming surface 132. Here, FIG. 3 is a perspective view schematically showing the flat screw 130. For convenience, FIG. 3 shows a state in which an upper-lower positional relationship is opposite to a state shown in FIG. 2.

As shown in FIG. 3, the first grooves 134 are formed in the groove forming surface 132 of the flat screw 130. The first groove 134 includes, for example, a central portion 135, a coupling portion 136, and a material introduction portion 137. The central portion 135 faces a communication hole 146 formed in the barrel 140. The central portion 135 communicates with the communication hole 146. The coupling portion 136 couples the central portion 135 and the material introduction portion 137. In the shown example, the coupling portion 136 is provided in a spiral shape from the central portion 135 toward an outer periphery of the groove forming surface 132. The material introduction portion 137 is provided on the outer periphery of the groove forming surface 132. That is, the material introduction portion 137 is provided on the side surface 133 of the flat screw 130. The material supplied from the material supply unit 110 is introduced from the material introduction portion 137 into the first groove 134, passes through the coupling portion 136 and the central portion 135, and is conveyed to the communication hole 146 formed in the barrel 140. For example, two first grooves 134 are formed.

The number of first grooves 134 is not particularly limited. Although not shown, three or more first grooves 134 may be formed, or only one first groove 134 may be formed. Although not shown, the three-dimensional molding device 100 may include an in-line screw instead of the flat screw 130.

As shown in FIG. 2, the barrel 140 is provided below the flat screw 130. The barrel 140 has a facing surface 142 facing the groove forming surface 132 of the flat screw 130. The communication hole 146 communicating with the first groove 134 is formed at a center of the facing surface 142. Here, FIG. 4 is a plan view schematically showing the barrel 140.

Figure 4:
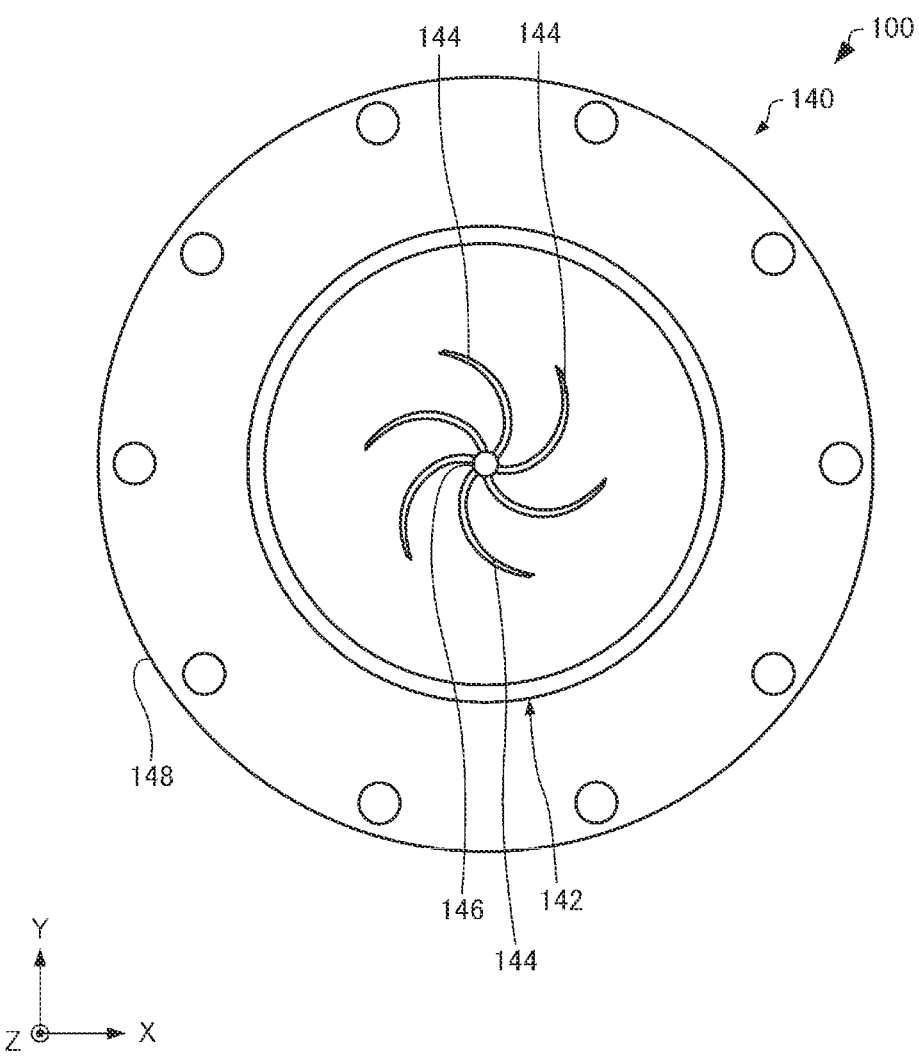
FIG. 4 is a plan view schematically showing a barrel of the three-dimensional molding device according to the present embodiment.

As shown in FIG. 4, second grooves 144 and the communication hole 146 are formed in the facing surface 142 of the barrel 140. A plurality of second grooves 144 are formed. In the shown example, six second grooves 144 are formed, but the number of second grooves 144 is not particularly limited. The plurality of second grooves 144 are formed around the communication hole 146 as viewed in the Z-axis direction. One end of the second groove 144 is coupled to the communication hole 146, and the second groove 144 extends spirally from the communication hole 146 toward an outer periphery 148 of the barrel 140. The second groove 144 has a function of guiding the plasticized molding material to the communication hole 146.

The shape of second groove 144 is not particularly limited, and may be, for example, linear. One end of the second groove 144 may not be coupled to the communication hole 146. The second groove 144 may not be formed in the facing surface 142. However, in consideration of efficiently guiding the plasticized material to the communication hole 146, the second groove 144 is preferably formed in the facing surface 142.

As shown in FIG. 2, the barrel heater 150 is provided on the barrel 140. The barrel heater 150 heats the material supplied between the flat screw 130 and the barrel 140. An output of the barrel heater 150 is controlled by the control unit 80. The plasticization unit 120 generates the plasticized molding material by heating the material while conveying the material toward the communication hole 146 by the flat screw 130, the barrel 140, and the barrel heater 150, and flows the generated molding material out from the communication hole 146. The barrel heater 150 may have a ring shape as viewed in the Z-axis direction. The barrel heater 150 may be omitted, and in this case, a heater may be provided at a position different from that of the barrel 140.

The nozzle 160 is provided below the barrel 140. A nozzle flow path 162 is formed in the nozzle 160. The nozzle flow path 162 communicates with the communication hole 146. The molding material is supplied to the nozzle flow path 162 from the communication hole 146. The nozzle flow path 162 has a nozzle opening 164. The nozzle opening 164 is formed in a distal end portion 166 of the nozzle 160. In the shown example, the distal end portion 166 is an end portion of the nozzle 160 in a −Z-axis direction. The nozzle 160 ejects the molding material from the nozzle opening 164 toward the stage 20.

As shown in FIGS. 1 and 2, the stage 20 is provided below the nozzle 160. In the shown example, the stage 20 has a rectangular parallelepiped shape. The stage 20 has a deposition surface 22 on which the molding material is deposited. The deposition surface 22 is a region on an upper surface of the stage 20. In the shown example, a perpendicular line P of the deposition surface 22 is parallel to the Z axis.

A material of the stage 20 is, for example, a metal such as aluminum. The stage 20 may include a metal plate and an adhesive sheet provided on the metal plate. In this case, the deposition surface 22 is formed of the adhesive sheet. The adhesive sheet can improve adhesion between the stage 20 and the molding material ejected from the molding unit 10.

Although not shown, the stage 20 may include a metal plate in which a groove is formed, and a base layer that embeds the groove. In this case, the deposition surface 22 is formed of the base layer. A material of the base layer is, for example, the same as the molding material. The base layer can improve the adhesion between the stage 20 and the molding material ejected from the molding unit 10.

The movement mechanism 30 supports the stage 20. The movement mechanism 30 changes relative positions of the nozzle 160 and the stage 20. In the shown example, the movement mechanism 30 changes the relative positions of the nozzle 160 and the stage 20 in the X-axis direction and the Y-axis direction by moving the stage 20 in the X-axis direction and the Y-axis direction. The movement mechanism 30 changes the relative positions of the nozzle 160 and the stage 20 in the Z-axis direction by moving the molding unit 10 in the Z-axis direction.

The movement mechanism 30 includes, for example, a first electric actuator 32, a second electric actuator 34, and a third electric actuator 36. The first electric actuator 32 moves the stage 20 in the X-axis direction. The second electric actuator 34 moves the stage 20 in the Y-axis direction. The third electric actuator 36 moves the molding unit 10 in the Z-axis direction. For example, the movement mechanism 30 may move the stage 20 in the Z-axis direction and move the molding unit 10 in the X-axis direction and the Y-axis direction, or may move the stage 20 or the molding unit 10 in the X-axis direction, the Y-axis direction, and the Z-axis direction as long as the movement mechanism 30 can change the relative positions of the nozzle 160 and the stage 20.

The support member 40 is coupled to the third electric actuator 36. The support member 40 supports the molding unit 10 and the upper heater 50. The movement mechanism 30 moves the molding unit 10 and the upper heater 50 in the Z-axis direction by moving the support member 40 in the Z-axis direction by the third electric actuator 36.

For example, the upper heater 50 has a plate shape. The upper heater 50 moves in conjunction with the nozzle 160. The upper heater 50 covers at least a part of the deposition surface 22 when the nozzle opening 164 overlaps a center of the stage 20 as viewed in the Z-axis direction. When the nozzle opening 164 overlaps the center of the stage 20 as viewed in the Z-axis direction, the upper heater 50 may cover only a part of the deposition surface 22 or may cover the entire deposition surface 22. The upper heater 50 heats the molding material deposited on the deposition surface 22.

As shown in FIG. 2, the upper heater 50 includes, for example, a support plate 52 and a heater member 54. The support plate 52 constitutes an upper surface of the upper heater 50. The support plate 52 is made of, for example, a heat insulating material. The heater member 54 constitutes a lower surface of the upper heater 50. The heater member 54 is implemented by, for example, a ceramic heater or a rubber heater. An output of the heater member 54 is controlled by the control unit 80.

Through holes 56 are formed in the upper heater 50. The through holes 56 penetrate the upper heater 50 in the Z-axis direction. At the time of molding, the nozzle 160 is located in the through hole 56. In the shown example, two through holes 56 are formed, the nozzle 160 of the first molding unit 10a is located in one through hole 56, and the nozzle 160 of the second molding unit 10b is located in the other through hole 56. The upper heater 50 is located above a position of the nozzle opening 164 at the time of molding. Specifically, the upper heater 50 is located above the position of the nozzle opening 164 in first to third contact processing and molding layer forming processing to be described later. The flat screw 130 and the barrel 140 are located above the upper heater 50, and the nozzle opening 164 and the stage 20 are located below the upper heater 50. In the shown example, "above" is a +Z-axis direction, and "below" is the −Z-axis direction.

A through hole 58 is formed in the upper heater 50. The through hole 58 penetrates the upper heater 50 in the Z-axis direction. As viewed in the Z-axis direction, a distance between the through hole 58 and a center of the upper heater 50 is larger than a distance between the through hole 56 and the center of the upper heater 50.

The measurement unit 60 measures a distance L between the deposition surface 22 of the stage 20 and the distal end portion 166 of the nozzle 160. The measurement unit 60 includes, for example, a first detection unit 61a, a second detection unit 61b, a first movement unit 65a, a second movement unit 65b, a first heat insulating member 66a, and a second heat insulating member 66b. For convenience, the movement units 65a, 65b are not shown in FIG. 1.

The first detection unit 61a moves in conjunction with the nozzle 160. In the example shown in FIG. 2, the first detection unit 61a is fixed to the support plate 52 of the upper heater 50. As shown in FIG. 1, the first detection unit 61a is provided inside an outer edge 59 of the upper heater 50 as viewed in the Z-axis direction. For example, the outer edge 59 has a quadrangular shape as viewed in the Z-axis direction. The second detection unit 61b moves in conjunction with the stage 20. In the shown example, the second detection unit 61b is fixed to the movement mechanism 30.

Each of the first detection unit 61a and the second detection unit 61b is a contact-type detection unit that outputs a detection signal to the control unit 80 while coming into contact with an object. Each of the first detection unit 61a and the second detection unit 61b includes, for example, a substrate 62, a contactor 63, and a biasing portion 64.

The substrate 62 supports the contactor 63 via the biasing portion 64. The substrate 62 includes an integrated circuit (IC). The substrate 62 can output the detection signal to the control unit 80.

The contactor 63 is a portion that comes into contact with an object. A material of a surface of the contactor 63 is, for example, ceramic. Accordingly, heat resistance of the contactor 63 can be improved. The contactor 63 of the first detection unit 61a can come into contact with the deposition surface 22 and the contactor 63 of the second detection unit 61*b*. The contactor 63 of the second detection unit 61*b* can come into contact with the distal end portion 166 of the nozzle 160 of the first molding unit 10*a* and the distal end portion 166 of the nozzle 160 of the second molding unit 10*b*. Since the stage 20 and the nozzle 160 each have a high temperature, it is preferable to improve the heat resistance of the contactor 63.

The biasing portion 64 couples the substrate 62 and the contactor 63. The biasing portion 64 biases the contactor 63 toward the outside. "Bias the contactor 63 toward the outside" means that the contactor 63 is biased toward a side opposite to the substrate 62. The biasing portion 64 of the first detection unit 61*a* biases the contactor 63 toward the upper heater 50. In the shown example, the biasing portion 64 of the first detection unit 61*a* biases the contactor 63 in the −Z-axis direction. The biasing portion 64 of the second detection unit 61*b* biases the contactor 63 toward the upper heater 50. In the shown example, the biasing portion 64 of the first detection unit 61*a* biases the contactor 63 in the +Z-axis direction. Here, the biasing portion 64 and the substrate 62 may be accommodated in the same housing and used as one component.

The biasing portion 64 is formed of, for example, a spring. A biasing force of the biasing portion 64 of the first detection unit 61*a* is different from a biasing force of the biasing portion 64 of the second detection unit 61*b*. For example, the biasing force of the biasing portion 64 can be adjusted by adjusting a spring constant of the biasing portion 64. For example, the biasing force of the biasing portion 64 of the first detection unit 61*a* is smaller than the biasing force of the biasing portion 64 of the second detection unit 61*b*.

The first detection unit 61*a* and the second detection unit 61*b* are implemented such that, when the first detection unit 61*a* and the second detection unit 61*b* come into contact with each other, one of the first detection unit 61*a* and the second detection unit 61*b* detects the contact. In a case where the biasing force of the biasing portion 64 of the first detection unit 61*a* is smaller than the biasing force of the biasing portion 64 of the second detection unit 61*b*, in the three-dimensional molding device 100, when the first detection unit 61*a* and the second detection unit 61*b* come into contact with each other, the first detection unit 61*a* detects the contact. That is, when the first detection unit 61*a* and the second detection unit 61*b* come into contact with each other, a detection signal is output from the first detection unit 61*a* to the control unit 80.

Each of the first detection unit 61*a* and the second detection unit 61*b* may be an A-contact switch-type detection unit that detects contact due to conduction of a current in the substrate 62, or a B-contact switch-type detection unit that detects contact due to non-conduction of a current in the substrate 62 when the contactor 63 comes into contact with an object and a switch is operated. It is preferable to use a B-contact type since time from contact of the detection units 61*a*, 61*b* to output of a detection signal to the control unit 80 is shorter in the B-contact type. The substrate 62, the contactor 63, and the biasing portion 64 constitute the switch. The detection units 61*a*, 61*b* are, for example, touch sensors.

Figure 5:
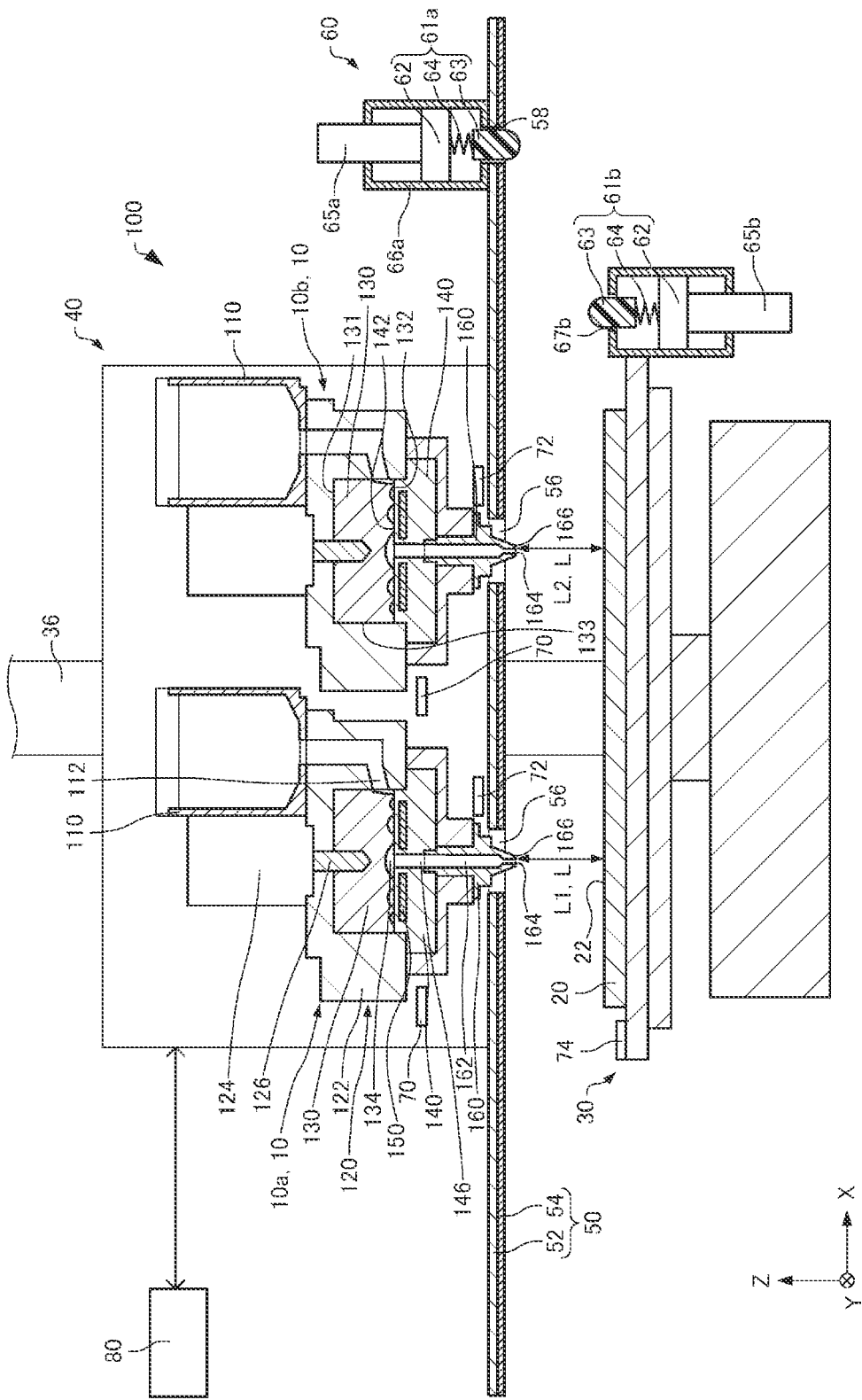
FIG. 5 is a cross-sectional view schematically showing the three-dimensional molding device according to the present embodiment.

The first movement unit 65*a* moves the first detection unit 61*a* between a measurement position and a standby position. The second movement unit 65*b* moves the second detection unit 61*b* between a measurement position and a standby position. Here, FIG. 5 is a cross-sectional view schematically showing the three-dimensional molding device 100. FIG. 5 shows a state in which the detection units 61*a*, 61*b* are at measurement positions. FIG. 2 shows a state in which the detection units 61*a*, 61*b* are at standby positions.

The first movement unit 65*a* moves the first detection unit 61*a* between the measurement position and the standby position by moving the first detection unit 61*a* in the Z-axis direction. As shown in FIG. 5, at the measurement position, a distal end of the contactor 63 of the first detection unit 61*a* protrudes from the first heat insulating member 66*a* and is located lower than the distal end portion 166 of the nozzle 160. The contactor 63 is brought into contact with the object at the measurement position. On the other hand, as shown in FIG. 2, at the standby position, the distal end of the contactor 63 of the first detection unit 61*a* is located above the upper heater 50 and is accommodated in the first heat insulating member 66*a*.

The second movement unit 65*b* moves the second detection unit 61*b* between the measurement position and the standby position by moving the second detection unit 61*b* in the Z-axis direction. As shown in FIG. 5, at the measurement position, a distal end of the contactor 63 of the second detection unit 61*b* protrudes from the second heat insulating member 66*b* and is located higher than the deposition surface 22. On the other hand, as shown in FIG. 2, at the standby position, the contactor 63 of the second detection unit 61*b* is located lower than the deposition surface 22 and is accommodated in the second heat insulating member 66*b*. Each of the movement units 65*a*, 65*b* may include an air cylinder. The movement units 65*a*, 65*b* are controlled by the control unit 80.

As shown in FIG. 2, the first heat insulating member 66*a* covers the first detection unit 61*a* at the standby position. The first heat insulating member 66*a* has a box shape. The first heat insulating member 66*a* accommodates the first detection unit 61*a* at the standby position. A through hole 67*a* is formed in the first heat insulating member 66*a*. The through hole 67*a* communicates with the through hole 58 formed in the upper heater 50. The distal end of the contactor 63 of the first detection unit 61*a* passes through the through hole 58 and the through hole 67*a*, and is located lower than the distal end portion 166 at the measurement position.

The second heat insulating member 66*b* covers the second detection unit 61*b* at the standby position. The second heat insulating member 66*b* has a box shape. The second heat insulating member 66*b* accommodates the second detection unit 61*b* at the standby position. A through hole 67*b* is formed in the second heat insulating member 66*b*. The distal end of the contactor 63 of the second detection unit 61*b* passes through the through hole 67*b* and is located higher than the deposition surface 22 at the measurement position. A material of the heat insulating members 66*a*, 66*b* is not particularly limited as long as the heat insulating members 66*a*, 66*b* have heat insulating properties.

The first replacement detection unit 70 detects at least one of replacement of the molding unit 10, replacement of the stage 20, and replacement of the nozzle 160. The molding unit 10, the stage 20, and the nozzle 160 are detachable.

When detecting replacement, the first replacement detection unit 70 outputs, to the control unit 80, a measurement start signal for starting measurement of the distance L between the deposition surface 22 and the distal end portion 166. Alternatively, when detecting replacement, the first replacement detection unit 70 outputs a replacement signal to the control unit 80. When receiving the replacement signal, the control unit 80 displays on a display unit (not shown) information indicating that the replacement was performed. A user visually recognizes the information and outputs a measurement start signal from an operation unit (not shown) to the control unit 80. The same applies to the second replacement detection unit 72 and the third replacement detection unit 74.

The display unit includes, for example, a liquid crystal display (LCD), an organic electroluminescence (EL) display, an electrophoretic display (EPD), or a touch panel display. The operation unit includes, for example, a mouse, a keyboard, or a touch panel.

In the shown example, the first replacement detection unit 70 detects replacement of the molding unit 10. Two first replacement detection units 70 are provided. One first replacement detection unit 70 detects replacement of the first molding unit 10*a*. The other first replacement detection unit 70 detects replacement of the second molding unit 10*b*.

The second replacement detection unit 72 detects replacement of the nozzle 160. In the shown example, two second replacement detection units 72 are provided. One second replacement detection unit 72 detects replacement of the nozzle 160 of the first molding unit 10*a*. The other second replacement detection unit 72 detects replacement of the nozzle 160 of the second molding unit 10*b*.

The third replacement detection unit 74 detects replacement of the stage 20. Each of the replacement detection units 70, 72, 74 may be a non-contact-type detection unit that does not come into contact with an object to be replaced, or may be a contact-type detection unit in which a switch is switched by contact or non-contact with an object to be replaced. Positions where the replacement detection units 70, 72, 74 are provided are not particularly limited as long as the replacement detection units 70, 72, 74 can detect replacement.

The control unit 80 is implemented by, for example, a computer including a processor, a main storage device, and an input and output interface that inputs a signal from the outside and outputs a signal to the outside. The control unit 80 exerts various functions, for example, by the processor executing a program read into the main storage device. Specifically, the control unit 80 controls the molding unit 10, the movement mechanism 30, the upper heater 50, and the measurement unit 60. The control unit 80 may be implemented by a combination of a plurality of circuits instead of the computer.

1.2. Processing of Control Unit

Figure 6:
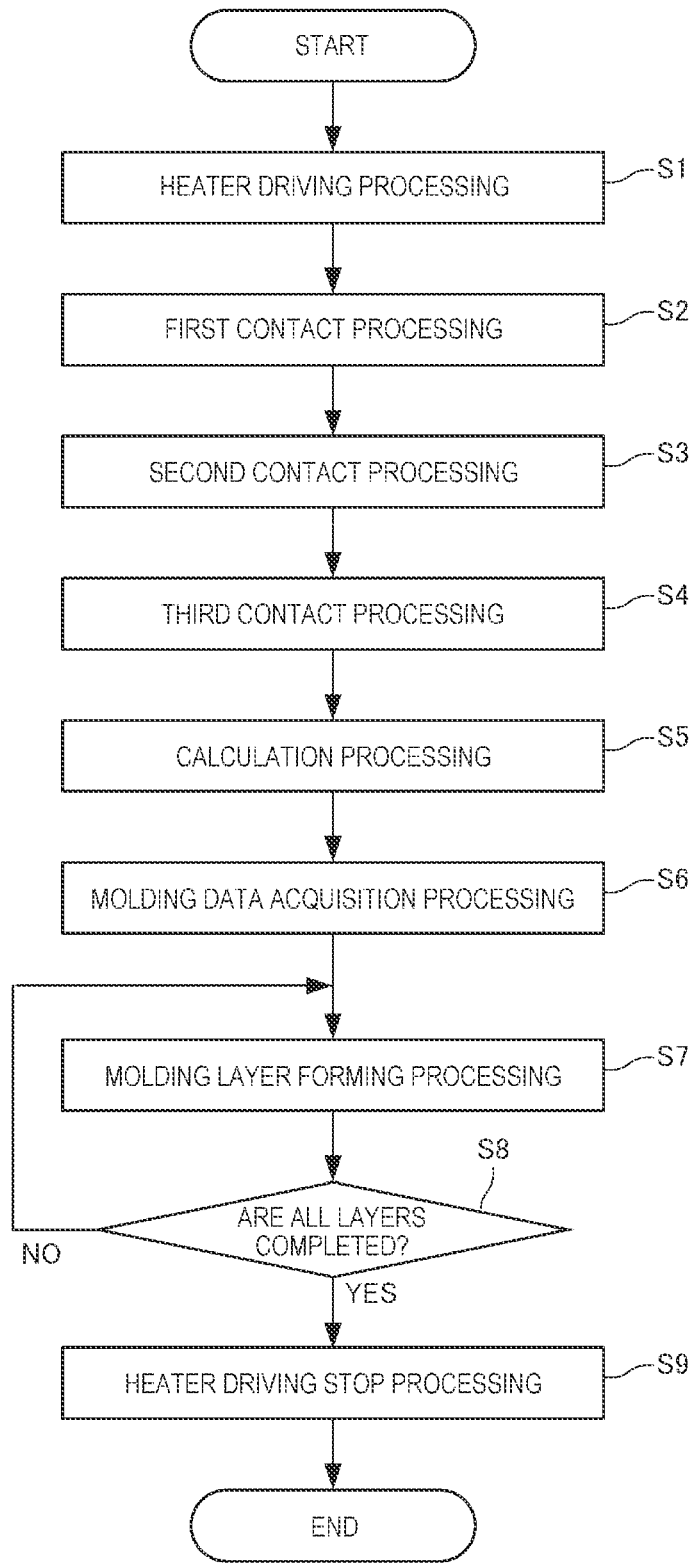
FIG. 6 is a flowchart showing processing of a control unit of the three-dimensional molding device according to the present embodiment.

FIG. 6 is a flowchart showing processing of the control unit 80.

First, when receiving the measurement start signal described above, the control unit 80 executes heater driving processing of driving the upper heater 50 and the barrel heater 150 at step S1 as shown in FIG. 6. By driving the upper heater 50 and the barrel heater 150, contact processing to be described later can be executed at a temperature close to an environmental temperature at the time of molding. Therefore, the distance L between the deposition surface 22 of the stage 20 and the distal end portion 166 of the nozzle 160 can be measured in consideration of thermal expansion of the stage 20 and the nozzle 160.

Next, at step S2, the control unit 80 executes first contact processing of controlling the movement mechanism 30 to bring the contactor 63 of the first detection unit 61*a* and the contactor 63 of the second detection unit 61*b* into contact with each other.

Specifically, the control unit 80 controls the first movement unit 65*a* to locate the distal end of the contactor 63 of the first detection unit 61*a* in the −Z-axis direction with respect to the distal end portion 166 of the nozzle 160. Further, the control unit 80 controls the second movement unit 65*b* to locate the distal end of the contactor 63 of the second detection unit 61*b* in the +Z-axis direction with respect to the deposition surface 22. Next, the control unit 80 controls the movement mechanism 30 to move the second detection unit 61*b* in the X-axis direction and the Y-axis direction. Next, the control unit 80 controls the movement mechanism 30 to move the first detection unit 61*a* in the −Z-axis direction and bring the first detection unit 61*a* into contact with the second detection unit 61*b*.

As described above, the biasing force of the biasing portion 64 of the first detection unit 61*a* is smaller than the biasing force of the biasing portion 64 of the second detection unit 61*b*. Therefore, when the first detection unit 61*a* comes into contact with the second detection unit 61*b*, the switch of the first detection unit 61*a* is operated, and the first detection unit 61*a* outputs a first detection signal to the control unit 80. At this time, the switch of the second detection unit 61*b* is not operated. When receiving the first detection signal, the control unit 80 controls the movement mechanism 30 to move the first detection unit 61*a* in the +Z-axis direction and separate the first detection unit 61*a* from the second detection unit 61*b*.

Next, at step S3, the control unit 80 executes second contact processing of controlling the movement mechanism 30 to bring the contactor 63 of the first detection unit 61*a* and the deposition surface 22 of the stage 20 into contact with each other.

Specifically, the control unit 80 controls the movement mechanism 30 to move the deposition surface 22 in the X-axis direction and the Y-axis direction. Next, the control unit 80 controls the movement mechanism 30 to move the first detection unit 61*a* in the −Z-axis direction and bring the first detection unit 61*a* into contact with the deposition surface 22. When the first detection unit 61*a* comes into contact with the deposition surface 22, the switch of the first detection unit 61*a* is operated, and the first detection unit 61*a* outputs a second detection signal to the control unit 80. When receiving the second detection signal, the control unit 80 controls the movement mechanism 30 to move the first detection unit 61*a* in the +Z-axis direction and separate the first detection unit 61*a* from the deposition surface 22.

Next, at step S4, the control unit 80 executes third contact processing of controlling the movement mechanism 30 to bring the contactor 63 of the second detection unit 61*b* and the distal end portion 166 of the nozzle 160 into contact with each other.

Specifically, the control unit 80 controls the movement mechanism 30 to move the second detection unit 61*b* in the X-axis direction and the Y-axis direction. Next, the control unit 80 controls the movement mechanism 30 to move the distal end portion 166 in the −Z-axis direction and bring the distal end portion 166 of the first molding unit 10*a* into contact with the second detection unit 61*b*. When the distal end portion 166 comes into contact with the second detection unit 61*b*, the switch of the second detection unit 61*b* is operated, and the second detection unit 61*b* outputs a third detection signal to the control unit 80. When receiving the third detection signal, the control unit 80 controls the movement mechanism 30 to move the distal end portion 166 in the +Z-axis direction and separate the distal end portion 166 from the second detection unit 61*b*.

Further, the control unit 80 controls the movement mechanism 30 to move the second detection unit 61*b* in the X-axis direction and move the distal end portion 166 in the −Z-axis direction, thereby bringing the second detection unit 61*b* and the distal end portion 166 of the second molding unit 10*b* into contact with each other. When the second detection unit 61*b* and the distal end portion 166 come into contact with each other, the switch of the second detection unit 61b is operated, and the second detection unit 61b outputs a fourth detection signal to the control unit 80. When receiving the fourth detection signal, the control unit 80 controls the movement mechanism 30 to move the distal end portion 166 in the +Z-axis direction and separate the distal end portion 166 from the second detection unit 61b. Next, the control unit 80 controls the first movement unit 65a to accommodate the contactor 63 of the first detection unit 61a in the first heat insulating member 66a, and controls the second movement unit 65b to accommodate the contactor 63 of the second detection unit 61b in the second heat insulating member 66b.

Next, at step S5, the control unit 80 executes calculation processing of calculating the distance L1 between the deposition surface 22 and the distal end portion 166 of the first molding unit 10a based on the acquired first detection signal, second detection signal, and third detection signal. Further, in the calculation processing, the control unit 80 calculates a distance L2 between the deposition surface 22 and the distal end portion 166 of the second molding unit 10b based on the acquired first detection signal, second detection signal, and fourth detection signal. Next, the control unit 80 displays on the display unit (not shown) the distances L1, L2.

When receiving a predetermined signal from the operation unit after step S5 is ended, the control unit 80 executes molding data acquisition processing of acquiring molding data for molding a three-dimensional molded object at step S6.

The molding data includes information on a type of the material stored in the material supply unit 110, a movement path of the nozzle 160 with respect to the stage 20, an amount of the molding material ejected from the nozzle 160, and the like.

The molding data is created by, for example, reading shape data by slicer software installed in a computer coupled to the three-dimensional molding device 100. The shape data is data representing a target shape of the three-dimensional molded object created using three-dimensional computer aided design (CAD) software, three-dimensional computer graphics (CG) software, or the like. For example, data in a standard triangulated language (STL) format or an additive manufacturing file format (AMF) is used as the shape data. The slicer software divides the target shape of the three-dimensional molded object into layers each having a predetermined thickness, and creates molding data for each layer. The molding data is represented by a G code, an M code, or the like. The control unit 80 acquires the molding data from the computer coupled to the three-dimensional molding device 100 or a recording medium such as a universal serial bus (USB) memory.

Next, at step S7, the control unit 80 executes the molding layer forming processing of forming molding layers by ejecting the molding material onto the deposition surface 22 of the stage 20.

Specifically, the control unit 80 plasticizes the material supplied between the flat screw 130 and the barrel 140 to generate the molding material, and ejects the molding material from the nozzle 160. For example, the control unit 80 continuously generates the molding material until the molding layer forming processing is ended. Here, FIG. 7 is a cross-sectional view showing the molding layer forming processing.

Figure 7:
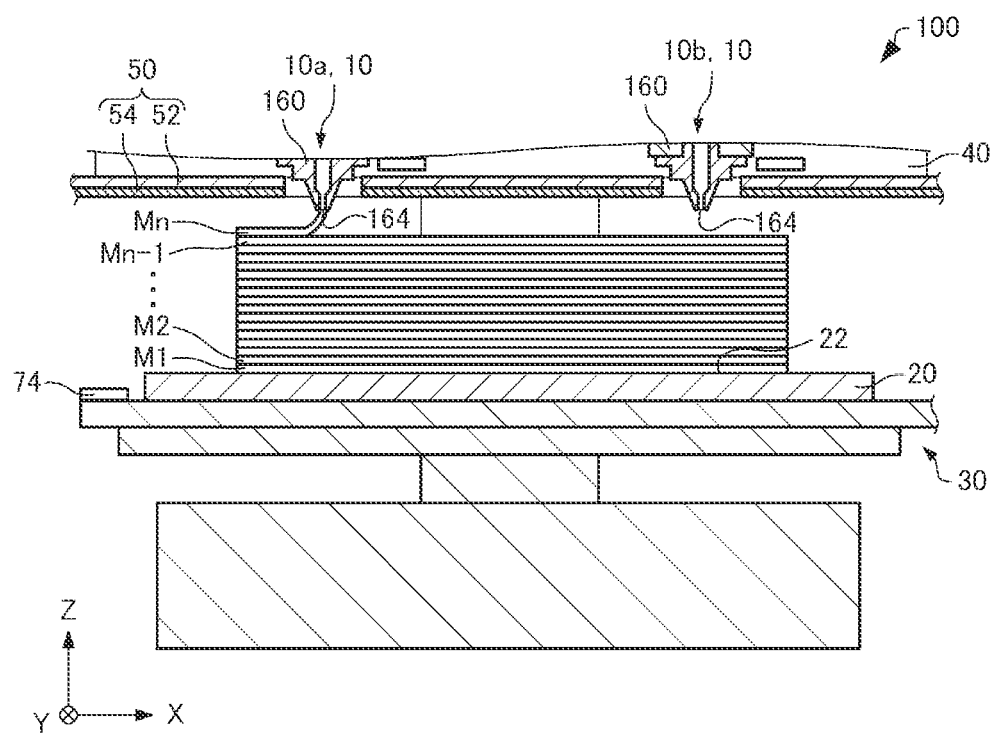
FIG. 7 is a cross-sectional view showing molding layer forming processing of the three-dimensional molding device according to the present embodiment.

As shown in FIG. 7, the control unit 80 controls the movement mechanism 30 to change the relative positions of the nozzle 160 and the stage 20 based on the acquired molding data, and controls the molding unit 10 to eject the molding material from the nozzle 160 toward the stage 20.

Specifically, before the molding layer forming processing is started, that is, before formation of a molding layer M1 that is a first molding layer is started, the nozzle 160 is disposed at an initial position in a −X-axis direction with respect to an end portion of the stage 20 in the −X-axis direction. As shown in FIG. 7, when the molding layer forming processing is started, the control unit 80 controls the movement mechanism 30 to move the nozzle 160 in a +X-axis direction relative to the stage 20, for example. When the nozzle 160 passes over the stage 20, the molding material is ejected from the nozzle 160. Accordingly, the molding layer M1 is formed. In FIG. 7, n is any natural number, and layers up to an $n^{th}$ molding layer Mn are shown.

Next, at step S8, the control unit 80 executes determination processing of determining whether formation of all the molding layers is completed based on the molding data.

When it is determined that the formation of all the molding layers is not completed ("NO" at step S8), the control unit 80 returns the processing to step S7. The control unit 80 repeats step S7 and step S8 until it is determined at step S8 that the formation of all the molding layers is completed.

On the other hand, when it is determined that the formation of all the molding layers is completed ("YES" at step S8), then at step S9, the control unit 80 executes heater driving stop processing of stopping driving the upper heater 50 and the barrel heater 150.

When a predetermined time has elapsed between step S5 and step S6, the control unit 80 may stop driving the upper heater 50 and the barrel heater 150, and drive the upper heater 50 and the barrel heater 150 again at step S7. Step S2, step S3, and step S4 do not need to be performed in this order, and steps S2 to S4 may be performed in any order.

Thereafter, the control unit 80 ends the processing.

1.3. Operational Effects

The three-dimensional molding device 100 includes the measurement unit 60 that measures the distance L between the deposition surface 22 and the distal end portion 166. The measurement unit 60 includes the contact-type first detection unit 61a that moves in conjunction with the nozzle 160, and the contact-type second detection unit 61b that moves in conjunction with the stage 20. The first detection unit 61a and the second detection unit 61b are implemented such that, when the first detection unit 61a and the second detection unit 61b come into contact with each other, one of the first detection unit 61a and the second detection unit 61b detects the contact.

Therefore, in the three-dimensional molding device 100, it is possible to facilitate the calculation processing of calculating the distance L in the control unit 80 as compared with a case where the first detection unit detects the first contact between the first detection unit and the second detection unit and the second detection unit detects the second contact between the first detection unit and the second detection unit or a case where the first detection unit and the second detection unit detect the contact at the same time. Since the detection signal is output when the first detection unit 61a and the second detection unit 61b actually come into contact with each other, the distance L can be measured more accurately as compared with a case where a non-contact-type detection unit is used, for example.

In the three-dimensional molding device 100, the measurement unit 60 includes the first movement unit 65a that moves the first detection unit 61a between the measurement position and the standby position, and the second movement unit 65b that moves the second detection unit 61b between the measurement position and the standby position. Therefore, in the three-dimensional molding device 100, during the molding layer forming processing of forming the molding layers by ejecting the molding material, the first detection unit 61a and the second detection unit 61b are moved to the standby positions, and thus the molding layer forming processing Can be executed without interfering with the first detection unit 61a and the second detection unit 61b.

In the three-dimensional molding device 100, the measurement unit 60 includes the first heat insulating member 66a that covers the first detection unit 61a at the standby position, and the second heat insulating member 66b that covers the second detection unit 61b at the standby position. Therefore, in the three-dimensional molding device 100, it is possible to prevent deterioration of the first detection unit 61a and the second detection unit 61b at the standby positions due to heat of the upper heater 50, for example.

In the three-dimensional molding device 100, each of the first detection unit 61a and the second detection unit 61b is a detection unit that detects the contact due to current conduction or non-conduction caused by pressing of the contactor 63. Each of the first detection unit 61a and the second detection unit 61b includes the biasing portion 64 that biases the contactor 63 toward the outside, and the biasing force of the biasing portion 64 of the first detection unit 61a is different from the biasing force of the biasing portion 64 of the second detection unit 61b. Therefore, in the three-dimensional molding device 100, by adjusting the biasing force of the biasing portion 64, when the first detection unit 61a and the second detection unit 61b come into contact with each other, one of the first detection unit 61a and the second detection unit 61b can detect the contact alone.

In the three-dimensional molding device 100, the biasing force of the biasing portion 64 of the first detection unit 61a is smaller than the biasing force of the biasing portion 64 of the second detection unit 61b. Therefore, in the three-dimensional molding device 100, when the first detection unit 61a and the second detection unit 61b come into contact with each other, the first detection unit 61a can detect the contact alone.

In the three-dimensional molding device 100, the control unit 80 executes the first contact processing of controlling the movement mechanism 30 to bring the first detection unit 61a and the second detection unit 61b into contact with each other, the second contact processing of controlling the movement mechanism 30 to bring the first detection unit 61a and the deposition surface 22 into contact with each other, and the third contact processing of controlling the movement mechanism 30 to bring the second detection unit 61b and the distal end portion 166 into contact with each other. Therefore, in the three-dimensional molding device 100, the control unit 80 can automatically calculate the distance L between the deposition surface 22 and the distal end portion 166.

When the biasing force of the biasing portion 64 of the first detection unit 61a is smaller than the biasing force of the biasing portion 64 of the second detection unit 61b, detection signals are continuously output from the first detection unit 61a in the first contact processing and the second contact processing. Therefore, it is possible to facilitate the calculation processing of the control unit 80.

For example, when the biasing force of the biasing portion of the first detection unit is larger than the biasing force of the biasing portion of the second detection unit, a detection signal is output from the second detection unit in the first contact processing, then a detection signal is output from the first detection unit in the second contact processing, and then a detection signal is output from the second detection unit in the third contact processing. As described above, when the detection unit that outputs the detection signal is switched every time the contact processing is executed, the calculation processing of the control unit may be complicated.

In the three-dimensional molding device 100, the control unit 80 executes the first contact processing, the second contact processing, and the third contact processing when the molding unit 10 is replaced, when the stage 20 is replaced, or when the nozzle 160 is replaced. When the molding unit 10, the stage 20, or the nozzle 160 is replaced, the distance L between the deposition surface 22 and the distal end portion 166 may be deviated from a predetermined value, but in the three-dimensional molding device 100, even when a deviation occurs in the distance L due to the replacement, the deviation can be corrected by the first contact processing, the second contact processing, and the third contact processing.

The three-dimensional molding device 100 includes the first replacement detection units 70, each of which detects at least one of replacement of the molding unit 10, replacement of the stage 20, and replacement of the nozzle 160. Therefore, in the three-dimensional molding device 100, at least one of the replacement of the molding unit 10, the replacement of the stage 20, and the replacement of the nozzle 160 can be automatically detected by the first replacement detection unit 70.

The three-dimensional molding device 100 includes the first molding unit 10a and the second molding unit 10b as the molding unit 10, and the control unit 80 brings the second detection unit 61b and the distal end portion 166 of the first molding unit 10a into contact with each other and brings the second detection unit 61b and the distal end portion 166 of the second molding unit 10b into contact with each other in the third contact processing. Therefore, in the three-dimensional molding device 100, it is possible to detect a difference in height between the distal end portion 166 of the first molding unit 10a and the distal end portion 166 of the second molding unit 10b.

The three-dimensional molding device 100 includes the upper heater 50 that is located above the position of the nozzle opening 164 at the time of molding and moves in conjunction with the nozzle 160. The upper heater 50 covers at least a part of the deposition surface 22 when the nozzle opening 164 overlaps the center of the stage 20 as viewed in the Z-axis direction, and the first detection unit 61a is provided inside the outer edge 59 of the upper heater 50 as viewed in the Z-axis direction. Therefore, in the three-dimensional molding device 100, a moving distance of the first detection unit 61a can be reduced when the first detection unit 61a is brought into contact with the object, as compared with a case where the first detection unit is provided outside the outer edge of the upper heater, and thus the three-dimensional molding device 100 can be reduced in size.

2. Modification of Three-dimensional Molding Device a Next, three-dimensional molding device according to a modification of the present embodiment will be described.

Hereinafter, in the three-dimensional molding device according to the modification of the present embodiment, differences from the three-dimensional molding device 100 according to the present embodiment described above will be described, and description of the same points will be omitted.

In the three-dimensional molding device 100 described above, the material supplied from the material supply unit 110 is the ABS resin.

However, in the three-dimensional molding device according to the modification of the present embodiment, a material supplied from the material supply unit 110 is a material other than the ABS resin, or a material obtained by adding other components to the ABS resin.

Examples of the material supplied from the material supply unit 110 include a thermoplastic material, a metal material, and a material made of various materials such as a ceramic material as a main material. Here, the "main material" means a material serving as a center forming a shape of a molded object, and means a material occupying 50% by mass or more in the molded object. The materials described above include a material obtained by melting the main material alone, and a material obtained by melting a part of components contained together with the main material into a paste form.

For example, a thermoplastic resin may be used as the thermoplastic material. Examples of the thermoplastic resin include a general-purpose engineering plastic and a super engineering plastic.

Examples of the general-purpose engineering plastic include polypropylene (PP), polyethylene (PE), polyacetal (POM), polyvinyl chloride (PVC), polyamide (PA), polylactic acid (PLA), polyphenylene sulfide (PPS), polycarbonate (PC), modified polyphenylene ether, polybutylene terephthalate, and polyethylene terephthalate. Examples of the super engineering plastic include polysulfone (PSU), polyether sulfone (PES), polyphenylene sulfide (PPS), polyarylate (PAR), (PI), polyimide polyamideimide (PAI), polyetherimide (PEI), and polyether ether ketone (PEEK).

A pigment, a metal, a ceramic, and other additives such as a wax, a flame retardant, an antioxidant, and a thermal stabilizer may be mixed into the thermoplastic material. In the plasticization unit 120, the thermoplastic material is plasticized and converted into a molten state by rotation of the flat screw 130 and heating of the barrel heater 150. The molding material generated in this manner is ejected from the nozzle 160 and then cured by a decrease in temperature. It is desirable that the thermoplastic material is ejected from the nozzle 160 while being heated to a temperature equal to or higher than a glass transition point thereof and completely melted.

In the plasticization unit 120, for example, a metal material may be used as a main material instead of the thermoplastic material described above. In this case, it is desirable that a powder material obtained by powdering the metal material is mixed with a component that is melted at the time of generation of the molding material, and the mixture is put into the plasticization unit 120.

Examples of the metal material include a single metal such as magnesium (Mg), iron (Fe), cobalt (Co), chromium (Cr), aluminum (Al), titanium (Ti), copper (Cu), and nickel (Ni), or an alloy containing one or more of these metals, maraging steel, stainless steel, cobalt chromium molybdenum, a titanium alloy, a nickel alloy, an aluminum alloy, a cobalt alloy, and a cobalt chromium alloy.

In the plasticization unit 120, a ceramic material can be used as a main material instead of the metal material described above. Examples of the ceramic material include oxide ceramics such as silicon dioxide, titanium dioxide, aluminum oxide, and zirconium oxide, and non-oxide ceramics such as aluminum nitride.

A powder material made of the metal material or the ceramic material supplied from the material supply unit 110 may be a mixed material obtained by mixing a plurality of types of powder of a single metal, powder of an alloy, or powder of a ceramic material. The powder material made of the metal material or the ceramic material may be coated with, for example, the thermoplastic resin described above or other thermoplastic resins. In this case, in the plasticization unit 120, the thermoplastic resin may be melted to exhibit fluidity.

For example, a solvent may be added to the powder material made of the metal material or the ceramic material supplied from the material supply unit 110. Examples of the solvent include water; (poly)alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetate (for example, tetrabutylammonium acetate); and ionic liquids such as butyl carbitol acetate.

In addition, for example, a binder may be added to the powder material made of the metal material or the ceramic material supplied from the material supply unit 110. Examples of the binder include an acrylic resin, an epoxy resin, a silicone resin, a cellulose-based resin, other synthetic resins, PLA, PA, PPS, PEEK, and other thermoplastic resins.

The embodiment and modification described above are merely examples, and the present disclosure is not limited thereto. For example, the embodiment and modification may be combined appropriately.

The present disclosure includes a configuration substantially the same as the configuration described in the embodiment, for example, a configuration having the same function, method, and result, or a configuration having the same object and effect. In addition, the present disclosure includes a configuration obtained by replacing a nonessential portion of the configuration described in the embodiment. In addition, the present disclosure includes a configuration having the same function and effect as the configuration described in the embodiment, or a configuration capable of achieving the same object. In addition, the present disclosure includes a configuration in which a known technique is added to the configuration described in the embodiment.

The following contents are derived from the embodiment and modification described above.

A three-dimensional molding device according to an aspect includes: a molding unit including a nozzle configured to eject a molding material from a nozzle opening formed in a distal end portion; a stage having a deposition surface on which the molding material is deposited; a movement mechanism configured to change relative positions of the nozzle and the stage; a measurement unit configured to measure a distance between the deposition surface and the distal end portion; and a control unit configured to control the movement mechanism. The measurement unit includes a contact-type first detection unit configured to move in conjunction with the nozzle, and a contact-type second detection unit configured to move in conjunction with the stage. The first detection unit and the second detection unit are configured such that, when the first detection unit and the second detection unit come into contact with each other, one of the first detection unit and the second detection unit detects the contact.

According to the three-dimensional molding device, it is possible to facilitate calculation processing of calculating the distance between the deposition surface and the distal end portion in the control unit.

In the three-dimensional molding device according to the aspect, the measurement unit may include a first movement unit configured to move the first detection unit between a measurement position and a standby position, and a second movement unit configured to move the second detection unit between a measurement position and a standby position.

According to the three-dimensional molding device, during molding layer forming processing of forming molding layers by ejecting the molding material, the first detection unit and the second detection unit are moved to standby positions, and thus the molding layer forming processing can be executed without interfering with the first detection unit and the second detection unit.

In the three-dimensional molding device according to the aspect, the measurement unit may include a first heat insulating member configured to cover the first detection unit at the standby position, and a second heat insulating member configured to cover the second detection unit at the standby position.

According to the three-dimensional molding device, it is possible to prevent deterioration of the first detection unit and the second detection unit at the standby positions due to heat of the upper heater, for example.

In the three-dimensional molding device according to the aspect, the first detection unit and the second detection unit may be detection units configured to detect the contact due to current conduction or non-conduction caused by pressing of a contactor, the first detection unit and the second detection unit may individually include a biasing portion configured to bias the contactor toward outside, and a biasing force of the biasing portion of the first detection unit may be different from a biasing force of the biasing portion of the second detection unit.

According to the three-dimensional molding device, by adjusting the biasing force of the biasing portion, when the first detection unit and the second detection unit come into contact with each other, one of the first detection unit and the second detection unit can detect the contact alone.

In the three-dimensional molding device according to the aspect, the biasing force of the biasing portion of the first detection unit may be smaller than the biasing force of the biasing portion of the second detection unit.

According to the three-dimensional molding device, when the first detection unit and the second detection unit come into contact with each other, the first detection unit can detect the contact alone.

In the three-dimensional molding device according to the aspect, the control unit may be configured to execute first processing of controlling the movement mechanism to bring the first detection unit and the second detection unit into contact with each other, second processing of controlling the movement mechanism to bring the first detection unit and the deposition surface into contact with each other, and third processing g of controlling the movement mechanism to bring the second detection unit and the distal end portion into contact with each other.

According to the three-dimensional molding device, the control unit can automatically calculate the distance between the deposition surface and the distal end portion.

In the three-dimensional molding device according to the aspect, the control unit may execute the first processing, the second processing, and the third processing when the molding unit is replaced, when the stage is replaced, or when the nozzle is replaced.

According to the three-dimensional molding device, even when a deviation occurs in the distance between the deposition surface and the distal end portion due to the replacement, the deviation can be corrected by first contact processing, second contact processing, and third contact processing.

The three-dimensional molding device according to the aspect may further include a replacement detection unit configured to detect at least one of replacement of the molding unit, replacement of the stage, and replacement of the nozzle.

According to the three-dimensional molding device, at least one of the replacement of the molding unit, the replacement of the stage, and the replacement of the nozzle can be automatically detected by the replacement detection unit.

In the three-dimensional molding device according to the aspect, the molding unit may include a first molding unit and a second molding unit, and the control unit may bring the second detection unit and the distal end portion of the first molding unit into contact with each other and bring the second detection unit and the distal end portion of the second molding unit into contact with each other in the third processing.

According to the three-dimensional molding device, it is possible to detect a difference in height between the distal end portion of the first molding unit and the distal end portion of the second molding unit.

The three-dimensional molding device according to the aspect may further include an upper heater located above a position of the nozzle opening at the time of molding and configured to move in conjunction with the nozzle. The upper heater may cover at least a part of the deposition surface when the nozzle opening overlaps a center of the stage as viewed in a direction perpendicular to the deposition surface. The first detection unit may be provided inside an outer edge of the upper heater as viewed in the perpendicular direction.

According to the three-dimensional molding device, a moving distance of the first detection unit can be reduced when the first detection unit is brought into contact with an object.

What is claimed is:
1. A three-dimensional molding device comprising:
   a molding unit including a nozzle configured to eject a molding material from a nozzle opening formed in a distal end portion;
   a stage having a deposition surface on which the molding material is deposited;
   a movement mechanism including three electric actuators, attached to the stage so as to support the stage, and configured to move the stage to change relative positions of the nozzle and the stage, the movement mechanism further including a base support that has a top surface on which the stage is mounted and has a side surface which is connected to an outer end of the top surface and is perpendicular to the top surface;
   a measurement unit configured to measure a distance between the deposition surface and the distal end portion;
   an upper heater configured to move in conjunction with the nozzle, the upper heater having a through hole that penetrates the upper heater; and a control unit configured to control the movement mechanism, wherein the measurement unit includes
  a contact-type first detector configured to move in conjunction with the nozzle, the contact-type first detector being supported by the upper heater, the first detector having a first contactor,
  a first movement unit configured to move the first detector, and
  a contact-type second detector configured to move in conjunction with the stage, the second detector being fixed to the side surface of the base support, the second detector having a second contactor,
  a distal end of the first contactor being movable through the through-hole by the first movement unit,
  the first contactor and the second contactor being configured to be directly contactable with each other, and
  the first detector and the second detector are configured such that, while the first contactor and the second contactor are in contact with each other, one of the first detector and the second detector detects the contact of the first contactor and the second contactor.

2. The three-dimensional molding device according to claim 1, wherein
  the first movement unit is configured to move the first contactor through the through-hole between a measurement position and a standby position, and
  the measurement unit further includes a second movement unit configured to move the second detector between a measurement position and a standby position.

3. The three-dimensional molding device according to claim 2, wherein
  the measurement unit includes a first heat insulating member configured to cover the first detector at the standby position, and a second heat insulating member configured to cover the second detector at the standby position.

4. The three-dimensional molding device according to claim 2, further comprising wherein
  the upper heater is located above a position of the nozzle opening at the time of molding and configured to move in conjunction with the nozzle,
  the upper heater covers at least a part of the deposition surface when the nozzle opening overlaps a center of the stage as viewed in a direction perpendicular to the deposition surface,
  a tip of the first contactor is located below a tip of the nozzle in the measurement position, and is located above the upper heater in the standby position, and
  a tip of the second contactor is located above the deposition surface in the measurement position, and is located below the deposition surface in the standby position.

5. The three-dimensional molding device according to claim 1, wherein
  one of the first detector and the second detector is configured to detect the contact due to current conduction or non-conduction caused by pressing of one of the first and second contactors,
  the first detector and the second detector include first and second biasing portions configured to bias the first and second contactors toward outside, respectively, and
  a biasing force of the first biasing portion of the first detector is different from a biasing force of the second biasing portion of the second detector.

6. The three-dimensional molding device according to claim 5, wherein
  the biasing force of the first biasing portion of the first detector is smaller than the biasing force of the second biasing portion of the second detector.

7. The three-dimensional molding device according to claim 1, wherein
  the control unit is configured to execute
    first processing of controlling the movement mechanism to bring the first contactor and the second contactor into contact with each other,
    second processing of controlling the movement mechanism to bring the first contactor and the deposition surface into contact with each other, and
    third processing of controlling the movement mechanism to bring the second contactor and the distal end portion into contact with each other.

8. The three-dimensional molding device according to claim 7, wherein
  the control unit executes the first processing, the second processing, and the third processing when the molding unit is replaced, when the stage is replaced, or when the nozzle is replaced.

9. The three-dimensional molding device according to claim 8, further comprising:
  a contact-type replacement detector in which a switch is switched by contact or non-contact with at least one of the molding unit, the stage, and the nozzle, and which is configured to detect at least one of replacement of the molding unit, replacement of the stage, and replacement of the nozzle.

10. The three-dimensional molding device according to claim 7, wherein
  the molding unit includes a first molding unit that includes the nozzle and a second molding unit that includes a different nozzle that is different from the nozzle and is configured to eject the molding material from a different nozzle opening formed in a distal end portion of the second molding unit, and
  the control unit brings the second contactor and the distal end portion of the first molding unit into contact with each other and brings the second contactor and the distal end portion of the second molding unit into contact with each other in the third processing.

11. The three-dimensional molding device according to claim 1, wherein
  the upper heater is located above a position of the nozzle opening at the time of molding and configured to move in conjunction with the nozzle,
  the upper heater covers at least a part of the deposition surface when the nozzle opening overlaps a center of the stage as viewed in a direction perpendicular to the deposition surface, and
  the first detector is provided inside an outer edge of the upper heater as viewed in the direction perpendicular to the deposition surface.

12. The three-dimensional molding device according to claim 1, wherein
  the first contactor of the first detector is further directly contactable to the deposition surface.

13. The three-dimensional molding device according to claim 1, wherein
  the upper heater is located above a position of the nozzle opening at the time of molding and configured to move in conjunction with the nozzle,
  the upper heater covers at least a part of the deposition surface when the nozzle opening overlaps a center of the stage as viewed in a direction perpendicular to the deposition surface, and the upper heater is located above the position of the nozzle opening while the first contactor and the second contactor are in contact with each other.

\* \* \* \* \*